United States Patent

Schmid et al.

(10) Patent No.: US 9,193,230 B2
(45) Date of Patent: Nov. 24, 2015

(54) CHAIN LINK WITH SPIKES FOR ANTISKID CHAINS, AND ANTISKID CHAIN COMPRISING SUCH CHAIN LINKS

(75) Inventors: Karl Schmid, Brückl (AT); Ägyd Pengg, Klagenfurt (AT)

(73) Assignee: Pewag Schneeketten Gmbh & Co. Kg, Bruekl (AT)

( * ) Notice: Subject to any disclaimer, the term of this patent is extended or adjusted under 35 U.S.C. 154(b) by 72 days.

(21) Appl. No.: 13/984,278

(22) PCT Filed: May 11, 2012

(86) PCT No.: PCT/EP2012/002039
§ 371 (c)(1),
(2), (4) Date: Aug. 7, 2013

(87) PCT Pub. No.: WO2012/163473
PCT Pub. Date: Dec. 6, 2012

(65) Prior Publication Data
US 2013/0312884 A1 Nov. 28, 2013

(30) Foreign Application Priority Data
May 31, 2011 (DE) .......................... 10 2011 102 879

(51) Int. Cl.
B60C 27/08 (2006.01)
B60C 27/02 (2006.01)

(52) U.S. Cl.
CPC ........... *B60C 27/086* (2013.04); *B60C 27/0223* (2013.04); *B60C 27/08* (2013.01); *Y10T 152/10279* (2015.01)

(58) Field of Classification Search
CPC ...... B60C 27/08; B60C 27/086; B60C 27/00; F16G 13/18

USPC ......... 152/231, 240, 243, 244, 245; D12/608; 59/78, 82, 84
See application file for complete search history.

(56) References Cited

U.S. PATENT DOCUMENTS

| | | | |
|---|---|---|---|
| 1,651,439 A | 12/1927 | Boyer | |
| 1,883,000 A * | 10/1932 | Senft | 152/245 |
| 2,180,097 A * | 11/1939 | Reyburn | 152/245 |
| 2,184,127 A | 12/1939 | Reybum | |
| 2,223,942 A | 12/1940 | McKinnon | |
| 2,538,046 A | 1/1951 | St. Pierre | |
| 2,784,760 A | 3/1957 | Harvey | |
| 3,752,205 A * | 8/1973 | Gower | 152/243 |
| 3,768,534 A * | 10/1973 | Gower | 152/239 |
| 4,361,178 A | 11/1982 | Gower | |
| 4,403,639 A | 9/1983 | Holte | |
| 4,452,290 A | 6/1984 | Asbeck | |
| 4,889,172 A | 12/1989 | Zeiser et al. | |
| D554,578 S * | 11/2007 | Roed | D12/608 |
| 2010/0078108 A1* | 4/2010 | Pengg et al. | 152/243 |

FOREIGN PATENT DOCUMENTS

| | | |
|---|---|---|
| DE | 296 20 212 U1 | 2/1997 |
| EP | 0 298 905 A1 | 1/1989 |
| WO | WO 2006/135249 A1 | 12/2006 |

* cited by examiner

*Primary Examiner* — Kip T Kotter
(74) *Attorney, Agent, or Firm* — Christensen Fonder, P.A.

(57) ABSTRACT

A chain link for antiskid chains of vehicle tires, which is provided in order to improve the grip properties, in particular on a smooth underlying surface, with one or more spike(s) which project on one of its sides. Each spike has, perpendicular to its longitudinal extent, a cross-section whose outer edge has a corrugated peripheral contour of successive troughs and peaks.

7 Claims, 2 Drawing Sheets

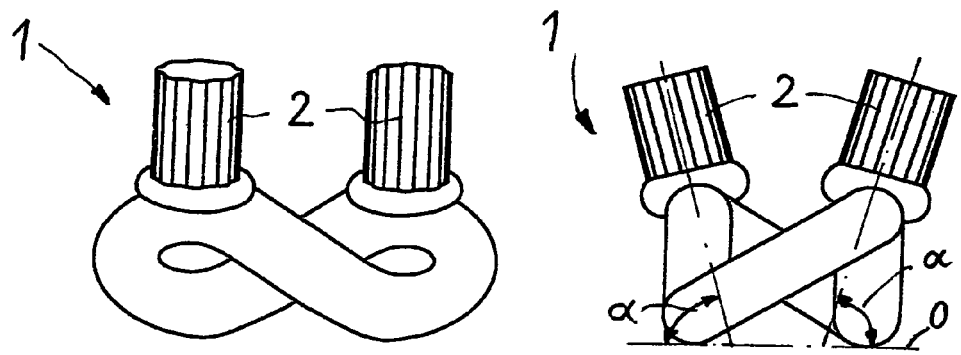
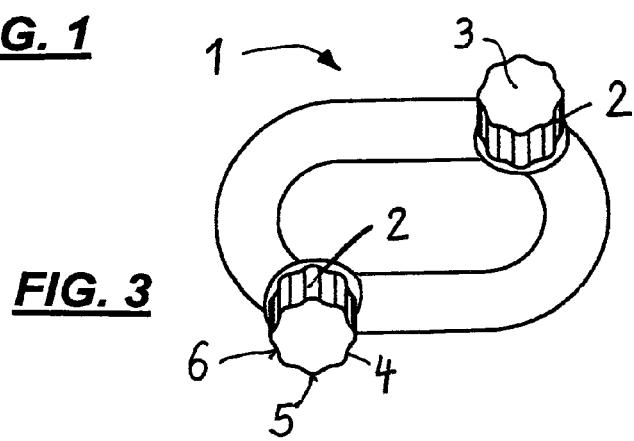
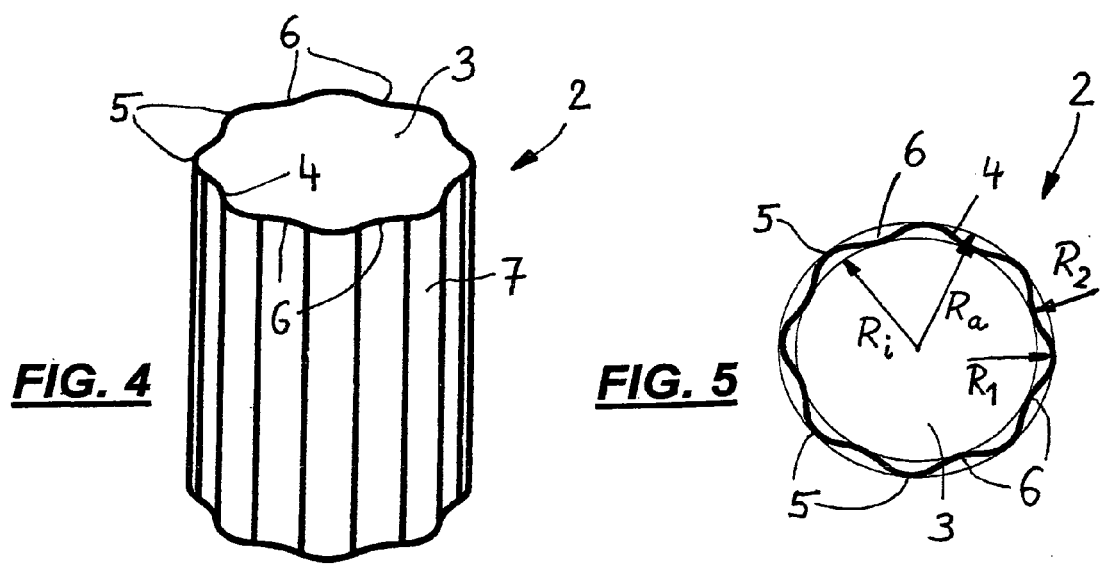
FIG. 1
FIG. 2
FIG. 3
FIG. 4
FIG. 5

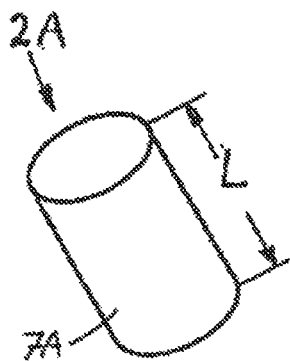
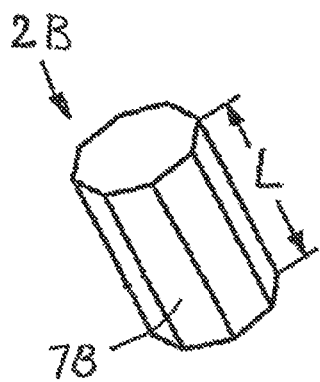
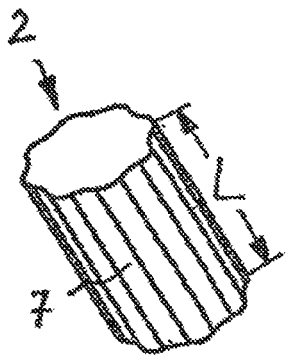
FIG. 6A
PRIOR ART
FIG. 6C
FIG. 6E
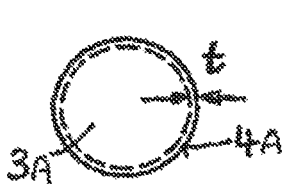
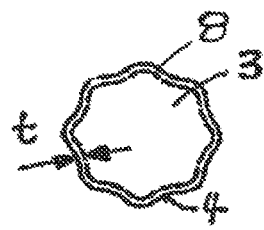
FIG. 6B
PRIOR ART
FIG. 6D
FIG. 6F
FIG. 7
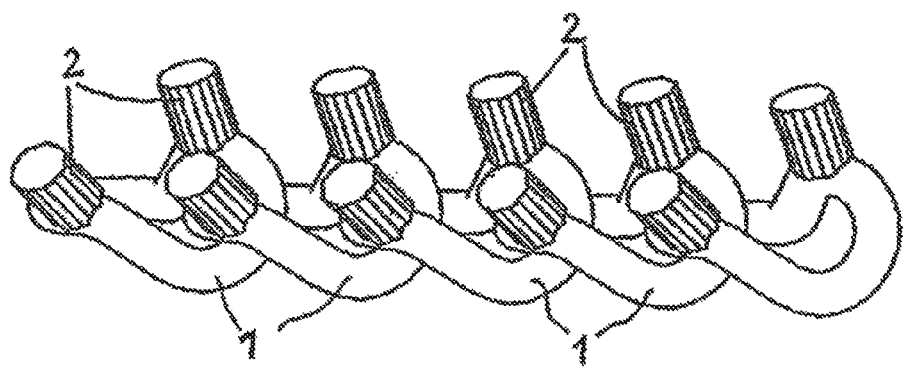

CHAIN LINK WITH SPIKES FOR ANTISKID CHAINS, AND ANTISKID CHAIN COMPRISING SUCH CHAIN LINKS

PRIORITY CLAIM

The present application is a National Phase entry of PCT Application No. PCT/EP2012/002039, filed May 11, 2012, which claims priority from German Application Number 102011102879.3, filed May 31, 2011, the disclosures of which are hereby incorporated by reference herein in their entirety.

FIELD OF THE INVENTION

The invention relates to a chain link for antiskid chains for vehicle tires, which, for improving the grip properties, in particular on a smooth underlying surface, is provided with one or more spike(s) projecting on one of its sides. The invention further relates to an antiskid chain for vehicle tires which comprises such chain links.

BACKGROUND OF THE INVENTION

It has long been known, for improving grip properties, in particular on a smooth underlying surface (such as snow or ice), to provide chain links for antiskid chains for vehicle tires with spikes which project on one side of the chain link, wherein in the case of an antiskid chain with such chain links fitted on a vehicle tire, these links are supported on the tire tread and the attached spikes project from the chain links away from the tire tread (U.S. Pat. No. 2,184,127 A, U.S. Pat. No. 2,223,942 A, U.S. Pat. No. 4,361,178 A).

In the past, usually spikes with a circular cross-section were used, with the spikes attached to the individual chain links (U.S. Pat. No. 4,403,639 A, U.S. Pat. No. 4,361,178 A) or provided in connecting links of chain strand sections of the tread network (EP 0 298 905 A1). The spikes used in such antiskid chains reduce the wear loading of the chain strand sections of the tread network and simultaneously improve the antiskid properties of the antiskid chain quite appreciably.

However, it was found that the spikes wear relatively quickly and at the same time they can also cause damage to road surfaces that are not ice-covered.

Chain links with spikes that have non-circular cross-sections, for instance rectangular or square cross-sections (U.S. Pat. No. 2,184,127, U.S. Pat. No. 2,223,942, WO 2006/135249 A1) or also polygonal cross-sections (WO 2006/135249 A1), are also known. Improvement of the traction properties of the antiskid chains provided with chain links with such spikes was always in the background.

Even if, when using chain links with spikes of non-circular cross-sections, it was sometimes possible to increase the time before the spikes were completely worn, particularly in the case of spikes configured with sharp edges, which led to increased antiskid capacity of the corresponding wheel chain, there was also at the same time however an increased tendency for road surfaces to be damaged.

BRIEF SUMMARY OF THE INVENTION

On this basis, the object to be achieved according to the invention is to propose chain links with spikes of the type stated at the beginning, which have an even longer time until complete wear of the spikes and also cause less damage to the surface of the road pavement while maintaining very good antiskid properties.

This is achieved according to the invention with a chain link of the type stated at the beginning, in that each spike has, perpendicular to its longitudinal extent, a cross-section whose outer edge is provided around its periphery with a rounded, corrugated contour of successive troughs and peaks.

The chain link according to the invention with its corrugated outer edge firstly shows an increase in volume of the hardened layer on the outer edge compared with that with a pure cylindrical cross-section or with other polygonal cross-sections of equal cross-sectional area and equal depth of hardening. Thus, tests showed that in the case of spikes with a constant cross-sectional area of 61.93 mm$^2$, a total length of 15 mm and a depth of hardening of 0.46 mm in the profile cross-section, the area covered by the hardened layer is 12.17 mm$^2$ with a circular cross-section, 12.48 mm$^2$ with a profile cross-section in the form of a regular octagon and 12.78 mm$^2$ with a configuration of the spikes according to the invention (with a basically circular cross-section, but with a periphery of corrugated configuration according to the invention) with eight troughs and eight peaks on its outer periphery, or in other words: the total volume of the hardened layer is 182.55 mm$^3$ with a configuration of the spike with a circular cross-section, 187.20 mm$^3$ with a cross-section in the form of a regular octagon and 191.7 mm$^3$ with the configuration according to the invention. It can be seen from this that with the shape of cross-section of the spike according to the invention there is an increase of 5% in the total volume of the hardened layer relative to a spike of circular cross-section, and still an increase of 2.4% relative to a spike with a cross-section in the shape of a regular octagon.

As a result of the increased total volume of the hardened layer in the edge region achieved with the invention, compared with other shapes of cross-section, overall there is also a longer usable time for wear of the spikes, which is a definite advantage in practical application.

Owing to the rounded, corrugated configuration of the outer edge of the spikes with a chain link according to the invention, with respect to the road surface on which a vehicle tire provided with a chain with chain links according to the invention runs, there is far less damage to the surface compared with spikes with profiles with a sharp edge configuration, which have a far more aggressive action on the road surface.

Despite these advantages, when using chain links according to the invention in antiskid chains, no decrease is found in the antiskid capacity.

With the invention, basically it is possible to use spikes with cross-sections for which the corrugated peripheral edge configuration is applied, with an otherwise basically circular or elliptical or even square or rectangular shape of cross-section.

Quite particularly preferably, however, spikes are used whose basic shape is in principle circular with a corrugated peripheral edge, for which the center line through all troughs and all peaks of the edge thus forms a circular cross-section, wherein the crests of all the peaks lie on a common outer circle and the bases of the troughs lie on an inner circle.

It is preferably envisaged that each peak touches the outer circle tangentially and each trough touches the inner circle tangentially.

A chain link according to the invention can be provided peripherally on its outer edge with a variable number of pairs of successive peaks and troughs, wherein however it has proved quite particularly advantageous if in each case eight peaks and eight troughs are provided. With this configuration of the spikes, the advantages of the invention can be achieved to a particularly good extent with conventional sizes of spikes.

Regarding the configuration of the rounded, corrugated contour on the outer edge of each spike, various geometric wave shapes can be used for this. Quite particularly preferably, however, curves in the shape of circular sections, contiguous with one another tangentially, are used, so that over the whole outer periphery of the spike, the wave shape always follows the shape of a circular section at every point.

However, the invention also relates to an antiskid chain for vehicle tires, which is provided with chain links of the form according to the invention stated above, which, with an antiskid chain fitted on a vehicle tire, are supported on the tire tread.

The spikes are preferably attached to the chain links in such a way that in the installed state of the antiskid chain they are inclined at an angle in the range from 12° to 20°, preferably of 15°, to the tire tread.

BRIEF DESCRIPTION OF THE DRAWINGS

The invention is explained in more detail below, in principle by way of example, with the help of the drawings. There are shown in:

FIG. 1 is a perspective side view of a chain link according to the invention with two spikes for an antiskid chain;

FIG. 2 is a perspective front view of the chain link from FIG. 1;

FIG. 3 is a top view of the chain link in FIGS. 1 and 2;

FIG. 4 is a perspective representation of a spike for the chain link according to FIGS. 1 to 3;

FIG. 5 is a top view of the spike according to FIG. 4;

FIG. 6A is a perspective side view of a known spike;

FIG. 6B is a cross-sectional representation of the spike of FIG. 6A perpendicular to its longitudinal central axis;

FIG. 6C is a perspective side view of a spike with a cross-section that is an equilateral octagon;

FIG. 6D is a cross-sectional representation of the spike of FIG. 6C perpendicular to its longitudinal central axis;

FIG. 6E is a perspective side view of a spike according to the invention, corresponding to FIG. 4;

FIG. 6F is a cross-sectional representation of the spike of FIG. 6E perpendicular to its longitudinal central axis; and FIG. 7 is a chain strand section from an antiskid chain according to the invention with chain links corresponding to FIGS. 1 to 3.

DETAILED DESCRIPTION OF THE INVENTION

FIGS. 1 to 3 show a chain link 1 for an antiskid chain, which, when the chain is fitted on the tread O (cf. FIG. 2) of a vehicle tire (not shown), is supported with its underside on the tread O, as shown in particular in FIG. 2.

The chain link 1 is moreover provided on its side facing away from the tread O with two spikes 2, which are fitted in a suitable manner, e.g. welded-on, on the chain link 1.

Viewed in the longitudinal direction of the chain link 1, the two spikes 2 are mutually offset sideways and in the longitudinal direction, which can best be seen from the top view of the chain link 1 according to FIG. 3.

The spikes 2 are arranged in such a way that in the installed state they are positioned at an acute angle α to the tread O of the tire which is in the range from 78° to 70°, but is preferably 75° (cf. FIG. 2).

FIG. 4 now shows one of the spikes 2 from FIGS. 1 to 3 in a perspective oblique view and FIG. 5 shows the shape of its cross-sectional area 3:

As can be seen from FIGS. 4 and 5, the cross-sectional area 3 of the spike 2 has an approximately circular contour, in which, however, the outer edge 4 has around its periphery a rounded, corrugated configuration with successive peaks 5 and troughs 6 in the circumferential direction.

The corrugated configuration of the outer edge 4 all around the periphery of the spike 2 is, as clearly shown in FIGS. 4 and 5, designed completely uniformly, i.e. all peaks 5 and all troughs 6 have a constant cross-section around the periphery.

The radially projecting ends of all peaks 5 are, as shown in FIG. 5, all on an outer envelope in the form of a circle with a radius $R_a$, whereas the bases of all troughs 6 are on an inner envelope in the form of a circle with a radius $R_i$ in the cross-section 3.

As can also be seen from the diagram in FIG. 5, viewed in the cross-section 3, the peaks 5 touch tangentially the inside of the outer circle with radius $R_a$, and the troughs 6 also touch tangentially the inner circle with radius $R_i$, but on its outside.

The curved portions of the peaks 5 in their radially outer region are in the shape of a circular arc with a radius $R_1$ and the radially inner sections of the troughs 6 in the cross-section are also in the shape of a circular arc with a radius of curvature $R_2$ (cf. FIG. 5), wherein in each case the two circular-arc shapes run into one another tangentially at their ends facing one another.

In the embodiment for the spikes 2 shown in the figures, in each case eight peaks 5 and eight troughs 6 are provided on the periphery of the cross-section 3. If desired, however, somewhat fewer or also more pairs of peaks 5 and troughs 6 could also be formed on the outer periphery of the spike 2.

In FIGS. 6A-6F, three spikes 2, 2A, 2B with different shapes of cross-section 3, 3A, 3B are shown in comparison with one another, wherein in each case a perspective oblique view (FIGS. 6A, 6C and 6E) of the spike 2, 2A, 2B is shown at the top and a representation of its shape of cross-section 3, 3A, 3B, (FIGS. 6B, 6D and 6F) thereunder.

The diagram on the left (FIGS. 6A-6B) shows a known cylindrical spike 2, 2A, 2B with circular cross-section 3, 3A, 3B and the embodiment in the middle (FIGS. 6C-6D) shows a spike with a cross-section 3, 3A, 3B that is an equilateral octagon. Finally, on the right (FIGS. 6E-6F) there is shown a spike of the form according to FIG. 4, which has a cross-section 3, 3A, 3B with a corrugated, rounded peripheral edge 4, 4A, 4B.

All three spikes 2, 2A, 2B shown in FIGS. 6A-6F have the same length L, and the respective cross-sections 3 are also of equal size.

In FIGS. 6A-6F, moreover, in each lower cross-section 3, 3A, 3B (FIGS. 6B, 6D and 6F) of the three spikes 2, 2A, 2B shown, the depth t of the case-hardened edge layer is drawn with dashes, the depth t of the hardened edge layer being the same for the three cross-sections shown.

For a practical comparison, the dimensions of the three spikes 2, 2A, 2B shown in FIGS. 6A-6F were selected in such a way that the length L in all three cases was 15 mm in each case and the cross-sectional area 3, 3A, 3B was in each case 61.93 mm². In the three cases shown, the depth t is 0.46 mm in each case.

Based on these dimensions, the total volume of the hardened edge layer down to the depth t was 182.55 mm³ for the cylindrical spike, 187.20 mm³ for the spike with the octagonal cross-section and 191.7 mm³ for the spike according to the invention with corrugated outer edge. It follows from this that the total volume of the hardened edge layer ("case-hardened layer") in the spike according to the invention is around 5% larger than in the cylindrical spike and is still 2.4% larger than in the octagonal spike with the same cross-sectional area.

The larger volume of the hardened edge layer follows, for the spike 2 according to the invention, from the fact that with the peripheral corrugated contour for the outer edge 4 of the spike cross-section 3, relative to the previously known shapes of cross-section, there is enlargement of the area of the peripheral surface 7 of the spike 2, which then also leads to an increased volume of the hardened edge layer 8 down to the depth t.

It should be pointed out that the spikes 2 in the embodiments shown in the above figures in each case only show one embodiment example, which can be modified in a variety of ways:

Thus, the number of successive peripheral peaks 5 and troughs 6 used on the outer periphery of the edge 4 can also be for example only six or, more preferably, more than eight, instead of the eight peaks 5 and troughs 6 shown in each case in the figures.

The corrugated peripheral edge 4 with the crests of the peaks 5 and the bases of the troughs 6 need not only be delimited, as shown in the embodiment example, by circular envelopes, instead shapes could also be used that resemble a square or a rectangle, wherein instead of the straight lateral lines, corrugated peripheral lateral lines are then used. Equally, cross-sections could also be provided for the spike 2, for which the outer and inner envelope lines for the peaks 5 and the troughs 6 are for example elliptical.

The spikes 2 can moreover be attached both to chain links 1 with a level mounting surface, and to chain links that have contours protruding from a mounting plane, such as a form as shown for example in FIGS. 1 to 3.

Finally, FIG. 7 also shows a perspective view of a chain strand section from an antiskid chain, which consists of the chain links 1 shown in FIGS. 1 to 3 with spikes corresponding to FIG. 4.

In addition to the shapes for spikes with corrugated curved peripheral edge 4 shown in FIGS. 1 to 5 and 6E-6F, spikes 2 can also be used in which the spikes 2 expand conically from their end projecting freely from the chain links 1 towards their attachment on the relevant chain link 1, wherein however only a very small taper is used, approximately of the order of 5° relative to the longitudinal central axis of the spike 2 in question.

Preferably the chain links 1 according to the invention are used on ladder chains, and here preferably on the connecting strands. Naturally, however, the chain links 1 according to the invention provided with spikes 2 can also be used with ladder chains on both lateral chains. Other applications are antiskid chains with various network shapes, such as e.g. Blamann tractor, forestry chains etc.

The invention claimed is:

1. A chain link for antiskid chains of vehicle tires, comprising an underside which, when the antiskid chain is fitted on a vehicle tire having a tire tread, is supported on said tire tread, and an upper side facing away from the tread, with at least two spikes being attached to the chain link on the upper side thereof and protruding therefrom, for improving the grip properties on a smooth underlying surface, each spike having a length and a longitudinal central axis, each of said spikes being mutually offset sideways in a longitudinal direction of the chain link and are inclined, in the installed state of the antiskid chain, at an angle in the range from 78° to 70° to the tire tread, wherein a cross-sectional area of each spike is continuous for the length of the spike and in a top view has a contour with an outer edge which has a configuration with at least six successive pairs of a trough and an adjacent peak circumferentially, and wherein each trough has a radially inner section and the radially inner sections of the troughs of each spike are in the shape of a circular arc, and wherein each peak has a radially outward section and the radially outward sections of each peak are in the shape of a circular arc, wherein the two circular-arc shapes of each trough and adjacent peak extend into one another tangentially at respective arc ends of said each trough and adjacent peak.

2. A chain link according to claim 1, wherein each peak has a crest and the crests of all the peaks lie on a common outer circle and each trough has a base, and the bases of all the troughs lie on an inner circle.

3. A chain link according to claim 2, wherein eight peaks and eight troughs are provided peripherally on the outer edge of each spike.

4. A chain link according to claim 2, wherein each peak touches the outer circle tangentially and each trough touches the inner circle tangentially.

5. An antiskid chain for vehicle tires, comprising chain links according to claim 1, which the antiskid chain fitted on a vehicle tire are supported on the tire tread.

6. An antiskid chain according to claim 5, wherein the spikes are attached to the chain links in such a way that in the installed state of the antiskid chain the spikes are inclined at an angle of 75° to the tire tread.

7. A chain link for antiskid chains of vehicle tires, comprising an underside which, when the antiskid chain is fitted on a vehicle tire having a tire tread, is supported on said tire tread, and an upper side facing away from the tread, with at least two spikes being attached to the chain link on the upper side thereof and protruding therefrom, for improving the grip properties on a smooth underlying surface, said spikes being mutually offset sideways in a longitudinal direction of the chain link and are inclined, in the installed state of the antiskid chain, at an angle in the range from 78° to 70° to the tire tread, wherein each spike has a cross-sectional area, and the cross-sectional area of each spike has a corrugated contour with a with at least six successive pairs of a trough and an adjacent peak circumferentially, and wherein each trough has a radially inner section and the radially inner sections of the troughs of each spike are in the shape of a circular arc, and wherein each peak has a radially outward section and the outward sections of each peak are in the shape of a circular arc, wherein the two circular-arc shapes of each trough and adjacent peak extend into one another tangentially at respective arc ends of said each trough and adjacent peak.

\* \* \* \* \*